United States Patent [19]
Lieberman et al.

[11] 3,890,295
[45] June 17, 1975

[54] METHODS AND COMPOSITIONS TO ENHANCE TALL OIL SOAP SEPARATION

[75] Inventors: Hillel Lieberman, Warminster; Robert J. Ziegler, Churchville, both of Pa.

[73] Assignee: Betz Laboratories, Inc., Trevose, Pa.

[22] Filed: June 15, 1973

[21] Appl. No.: 370,508

[52] U.S. Cl............ 260/97.6; 260/30.8 R; 260/97.5; 260/97.6
[51] Int. Cl.² ...................... C09F 7/00; C11D 15/00
[58] Field of Search............... 260/97.6, 30.81, 97.7, 260/97.5

[56] References Cited
UNITED STATES PATENTS
2,950,272  8/1960  Kirkpatrick...................... 260/97.5

OTHER PUBLICATIONS
The Paper Industry & Paper World "Wise," pp. 822–826.

*Primary Examiner*—Melvyn I. Marquis
*Assistant Examiner*—William E. Parker
*Attorney, Agent, or Firm*—Alexander D. Ricci

[57] ABSTRACT

The present disclosure is directed to methods and compositions for enhancing tall oil soap recovery during the concentration of a black liquor derived from kraft or sulfate pulping processes. The methods basically provide for the addition to the black liquor of an effective amount of a polyoxypropylene - polyoxyethylene condensate, or a composition containing said condensate.

11 Claims, No Drawings

METHODS AND COMPOSITIONS TO ENHANCE TALL OIL SOAP SEPARATION

BACKGROUND OF THE INVENTION

Tall oil soap from which tall oil is produced is a major-by-product of the kraft or sulfate (alkaline) pulping process. The alkaline pulping of soft wood produces or liberates fatty acids, resin acids and unsaponifiable compounds which until converted to tall oil exist as sodium salts of soaps (tall oil soaps) that are carried with the black liquor from the pulp washing systems to the evaporators in various stages to a degree suitable for burning and the recovery of various inorganic chemicals.

As the total solids content is increased by evaporation to about 18 to 30% solids, the tall oil soap rises to the surface of the liquor. The soap is then removed from the surface in a skimming operation carried out in a tank which received the liquor from, usually, the fourth effect of the evaporators and returns the liquor to the third. Because of the evaporation economies and the amount of black liquor concentrated, it is necessary to maintain the operation as continuous as possible with the objective of separating as much tall oil soap as possible.

Because of the current great demand for crude tall oil, mills are extremely interested in new methods or techniques for improving the recovery of crude tall oil. Accordingly, any improvement in the recovery efficiency of tall oil soap from the black liquor would, of course, result in increased yields of crude tall oil. At present it is estimated that approximately 75% of the total crude oil potential from a ton of pine chips is recovered while 25 percent is lost with the underflow from the soap skimmer. At current market values of $110 per ton, the loss represents an annual loss in revenue to pinekraft mills of approximately 16 million dollars. Previously conducted studies have indicated that the non-recoverable tall oil soap remains dissolved or suspended in the liquor leaving the soap skimmer. Accordingly it was the present inventors' objective to provide a composition and/or a method for improving the efficiency of the tall oil soap recovery operation to thereby avoid the loss of dissolved and/or suspended tall oil soap.

GENERAL DESCRIPTION OF THE INVENTION

The present inventors discovered that enhanced recovery of tall oil soap could be achieved using an effective amount of a material described below or a composition containing such. The material may be described as a polyoxyethylene - polyoxypropylene condensate. More specifically, the condensates of the invention are those specifically described and those that are obviously related to those described in U.S. Pat. No. 2,674,619. The patent reveals that if water soluble polyoxyethylene groups are added to both ends of a water insoluble polyoxypropylene chain, a complete series of block polymers can be derived.

The block polymers are prepared by reacting propylene oxide with two hydroxyl groups of a propylene glycol. The resulting molecule can be produced so as to control the length thereof so as to permit molecular weights of from 800 to several thousands.

By adding ethylene oxide to both ends of the polyoxypropylene molecule(s) it is possible to produce a condensate containing for the most part polyoxyethylene hydrophilic groups on the ends of the molecule(s). These hydrophilic groups are controlled in length to constitute anywhere from about 10 to 80% of the molecule. The condensates which preferably have a molecular weight of from 1000 to 16,000 and preferably from about 1500 to 9000 may be represented by the structure

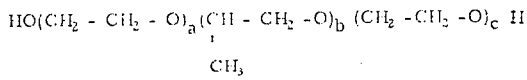

It is apparent that the structure is quite simplified since during reaction it is likely that mixtures and other forms of condensates may be obtained.

The condensate may be added to the black liquor either as is, or as an aqueous system or as a hydrocarbon solvent system. Where the condensate is used above effective treatment range of 5 to 1000, and preferably from about 25 to 200 ppm. In some situations it is desirable to add the condensate via a formulated product containing various solubilizing agents, stabilizers, dispersants, wetting agents, and/or cold-weather stability agents.

In the latter situation the compositions may comprise for example on a weight ration percentage the following ingredients:

i. from 1 to about 50%, and preferably from about 4 to 25% of the condensate, ii. from about 0.5 to about 30%, and preferably 2 to 15% of a tallow fatty acid having from 12 to 24 carbon atoms (preferably 16 to 18), iii. from about 0.5 to about 30%, and preferably 2 to 15% of a tallow fatty alcohol having from 12 to 24, and preferably 16 to 18 carbon atoms, iv. from about 65 to 95%, and preferably 75 to 93% of a water insoluble organic liquid such as vegetable oils, aliphatic hydrocarbons, alicyclic hydrocarbons, aromatic hydrocarbons, halogenated aliphatic hydrocarbons, halogenated alicyclic hydrocarbons, halogenated aromatic hydrocarbons, long chain amines and the like.

The composition may additionally contain from 0.5 to about 8% and preferably from about 2 to about 6% of a lower alkanol solubilizing agent such as the one to six carbon alcohols, i.e. methanol, ethanol, isopropanol and hexanol.

Agents of this nature are used to provide cold temperature stability in those areas and applications which require this feature. The foregoing recitations relative to the composition, although the most effective are not necessarily the only percentages of each that may be utilized. The percentages recited represent the desirable ranges from both effectiveness and economic points of view.

The effective and economic treatment levels for the inventive composition should be such so as to insure that the condensate is used in an amount in the range from about 5 to 1000 parts per million by weight of the liquor system, and preferably from about 25 to about 200 parts per million parts of the black liquor system (ppm). Although treatment levels above 1000 ppm based upon the weight of the system, are quite effective in enhancing tall oil soap recovery, the use of excesses about these levels are prohibitive due to economic considerations. Accordingly, the upper treatment level is predicted upon cost considerations rather than limit of effectiveness.

As a further explanation or description of the ingredients of the composition, the following will be of help.

The tallow acids are basically the saturated and unsaturated mono and dicarboxylic fatty acids having from about 12 to 24 carbon atoms, and preferably 16 to 18 carbon atoms such as stearic acid, palmitic and oleic acid and mixtures thereof. In many instances, the tallow acids as obtained are in fact mixtures of various fatty acids such as mixtures of palmitic, stearic and oleic acids. Likewise, the tallow alcohols have from about 12 to 24, but normally from 16 to 18 carbon atoms.

The water insoluble organic liquids which can be advantageously used in the composition are the vegetable oils, such as the water insoluble edible oils which are extracted from seeds and which are generally considered to be mixtures of glycerides, the aliphatic hydrocarbons, the alicyclic hydrocarbons and the aromatic hydrocarbons and the halogenated derivatives thereof. These generic descriptions include many type carriers or liquids such as benzene, hexane, octane, mineral hydrocarbons such as the mineral oils (paraffinic oils, naphthenic oils, halogenated products thereof and kerosene). Mineral seal oil and similar petroleum fractions, synthetic polymers and halogenated products thereof, such as the liquid triflurovinyl chloride polymers, long chain alcohols such as nonyl alcohol and octyl alcohol, long chain esters such as diglycol laurate, and long chain amines such as octyl amine, nonyl amine and 2-ethyl-amino-heptane. In many instances these liquid carriers are not only water soluble, but also hydrophobic.

The carrier liquid should be of such nature that its boiling point should be greater than 150° F and its viscosity should be such as to be liquid at room temperature. In the case of mineral hydrocarbons a viscosity of about 30 to 400 SUS (100° F) has been found to be completely acceptable. From the vast number of water soluble liquids evaluated, it would appear that any liquid which possesses the aforementioned properties would be operable.

Spreading agents or surfactants which are commercially available such as sorbitan monostearate and the surfactants, decyl alcohol, silicone oils (Union Carbides L45) and the polyether triols of high molecular weight (Union Carbides LHT42) have been used successfully in the inventive compositions. These agents are generally included where rapid distribution of the composition in a particular system is required.

The compositions of the invention can be made simply by mixing the ingredients thoroughly, heating the mixture to a temperature of from about 115° to 150° F for a time to insure that the ingredients have been dissolved and thoroughly incorporated. The blend is then cooled slowly to 100° F and at this point other ingredients such as the solubilizing agent may be added. The product is then ready for use. The heating is merely an expedient in the preparation, since products prepared without heating but with longer mixing times operate as effectively.

In order to determine the capacity of the composition of the present invention to enhance soap separation, a test procedure was used which placed the sample black liquor solution under conditions similar to those experienced in the evaporation-skimming process.

In order to more accurately assimilate the conditions, actual black liquor samples from various alkaline pulping processes were obtained directly from the mills. These black liquor samples were approximately 5–10% in solids consistency. More specifically, the liquor samples are comprised of approximately 90–95% aqueous medium and approximately 0.5% lignins, soaps, resins, etc. The liquors were those which normally would be fed to the evaporators and concentrated to an 18–30, and preferably a 22–25% solids content.

TEST PROCEDURE

The primary objective of the procedure was to simulate as closely as possible the conditions encountered in a functioning evaporation process with respect to the tall soap skimming operation. In a normal operation the additive would be added to the black liquor prior to or at the time of its introduction into the first effect of the multiple effect evaporator, or in any stage after, but prior to the skim tank. The most desirable area for additive dosage is the intake side of the skim tank. Accordingly, the initial tests were conducted with the desire to simulate that which occurs in the most desirable area for addition of the additive. However advantages such as improved heat transfer had been noted where additive is placed in the first of the multiple effects of the evaporator system. Therefore, the procedure was as follows:

1. A weak black liquor or skim tank inflow sample (diluted at the mill to prevent tall oil soap separation and oxidation (during transit) was placed in a rotary evaporator (Rinco). The samples were heated and water flashed off to obtain a solid content of, typically, 22–25%, at a final temperature of 170°–180°F.

2. Portions of this liquid (e.g. 100 cc) were removed from below the surface of any tall soap which may have separated, and added to containers containing the additives to be tested.

3. These portions were then held at a temperature of 170°–180° F. for approximately one-half hour with no agitation except for brief initial stirring.

4. Portions of these samples were pipette sampled below the surface of any separated tall oil soap and immediately diluted for Buckeye determination.

The "Buckeye" Method for the Determination of Tall Oil in Sulfate Black Liquor was originally developed by Saltsman and Kuiken and published in TAPPI 42, No. 11 pp 873–874. By determining the amount of tall oil producible from the various quantities of black liquor sampled, it is possible to ascertain the corresponding amount of tall oil soap contained in the black liquor before and after treatment with the additive.

For the purpose of the present determination the "Modified Buckeye Procedure" described below was utilized.

MODIFIED BUCKEYE PROCEDURE

Reagents:
18% hydrogen peroxide
(3 pts. 30% $H_2O_2$ + 2 pts. $H_2O$)
20% sodium sulfite solution
1:1 HCl solution
Buckeye Solvent -  1600 ml. acetone
                    1200 ml. petroleum ether
                    400 ml. methanol
Petroleum Ether
Wash Solvent    -   400 ml. acetone
                    200 ml. methanol
                    200 ml. water
Isopropyl Alcohol
Absolute Ethanol
0.02N methanolic KOH
A% Thymol Blue in DMF indicator

MODIFIED BUCKEYE PROCEDURE

Equipment:

4–500 ml. separatory funnels with stand
3– 10 ml. graduated cylinders
2– 25 ml. graduated cylinders
1–100 ml. graduated cylinders
1–500 ml. graduated cylinders
1–100 ml. pipette
2–250 ml. erlenmeyer flasks
pan
hot plate
hood (for evaporation)
1– 25 ml. buret
over (for solids det'n)
2– evporating dishes

Procedure:

1. From known data or quick check in the oven get an approximate black liquor solids content.
2. Dilute the black liquor sample to about 5% solids. Should have at least 400 ml. of diluted sample.
3. Pipette 100 ml. aliquots of the diluted b.l. into each of two separatory funnels.
4. Measure out:
   5 ml. 18% peroxide solution
   5 ml. 20% $Na_2SO_3$ solution
   10 ml. 1:1 HCl
into the three 10 ml. graduated cylinders. To one b.l. sample add the peroxide solution and mix by swirling the liquid in the sep. funnel for 1 minute.
5. Next add the $Na_2SO_3$ sol'n. and swirl for 1 minute.
6. Next add the HCl sol'n. and swirl for 1 minute.
7. Add 400 ml. Buckeye solvent to the sep. funnel. Mix lightly and release the gas pressure. After several cautious mixes, shake vigorously, release pressure, and allow to settle.
8. Repeat steps 4–7 on the other b.l. sample.
9. Going back to the first sample, draw off the b.l. layer into the second sep. funnel.
10. Extract the b.l. with 100 ml. of pet. ether.
11. Discard the b.l. layer and combine the pet. ether layer with the
12. Buckeye solvent in the first sep. funnel. Wash 4 or 5 times with 20 ml. each time of the wash solvent.
13. Add 1 ml. anhydrous ethanol to the washed Buckeye solvent portion at a time into a 250 ml. erlenmeyer flask. Evaporate to dryness on a water bath in a hood. Heating in a 105° C oven may be necessary to remove the last traces of water.
14. While first sample is evaporating, repeat steps 10–13 on the second sample.
15. When the first sample is completely evaporated, add 20–25 ml. of isopropyl alcohol and 1 drop of thymol blue indicator. Titrate with 0.02N methanolic KOH to first definite blue end point.
16. Repeat for the second sample and also run a blank titration on the Buckeye solvent.
17. The weight of tall oil can be calculated from:

$$\text{wt. tall oil (g)} = \frac{(\text{ml KOH} - \text{ml. KOH blank}) \times N_{KOH} \times 56.1}{172}$$

for 0.02N KOH wt. tall oil (g) = 0.006525 (ml KOH - ml KOH blank)

18. Tall oil is always expressed as per cent on black liquor solids. Weight two 50 g. samples of diluted b.l. from Step 2 into tared evaporating dishes. Evaporate to dryness overnight in 105°C oven. Reweigh to determine solids content.

$$\% \text{ tall oil on solids bases} = \frac{\text{wt. tall oil (g.)} \times 10}{\text{g. solids in 10 g. dil. b.l.}}$$

SPECIFIC EXAMPLES

In order to establish the effectiveness of the composition of the present invention, the following products were prepared and tested in accordance with the Test Procedure outlined earlier. To accurately ascertain the overall effectiveness of the products, the products were tested using black liquors taken from many different sources.

The products were prepared by merely blending or dispersing the condensate with the vehicle, or in the case of formulated compositions, by blending the ingredients and heating the blend at a temperature at 145° F. for a time sufficient to dissolve all of the soluble ingredients and to homogeneously mix the insoluble ingredients (e.g. 15 minutes). The compositions were then allowed to cool, after which the lower alkanol, if used, was added and thoroughly mixed in. The product was then ready for testing or use.

EXAMPLE 1

The composition of this Example contained the following ingredients in the respective percentages by weight:

10.0% tallow fatty acid (HCP, a mixture of primarily palmitic, stearic and oleic acids)
8.0% Alfol 1618C (a mixture of 62% - C18 - fatty alcohol and 35% - C16 fatty alcohol, 3% of similar type alcohols - commonly known as tallow alcohols).
6.0% isopropanol
72.0% Tufflo 100 (a paraffinic oil having an SUS of 105 at 100° F)
4.0% Condensate of polyoxyethylene-polyoxypropylene (hereafter referred to as "condensate") having an average molecular weight of approximately 2000 - (liquid).

The products of the following Examples contained the ingredients listed thereunder on the percentage weight basis listed.

EXAMPLE 2

20% Polyoxyethylene-polyoxypropylene condensate having an average molecular weight of approximately 6350 (paste), and
80% water

EXAMPLE 3

25% Condensate (flake) having an average molecular weight of approximately 8350, and
75% water

EXAMPLE 4

25% Condensate (liquid) having an average molecular weight of 2500, and
75% water

EXAMPLE 5

15% Condensate (liquid) having an average molecular weight of 3500,
12% ehtyl alcohol, and
73% water

EXAMPLE 6

15% Condensate (liquid) having an average molecular weight of approximately 3800,
30% ethyl alcohol, and
55% water

EXAMPLE 7

20% Condensate (liquid) having an average molecular weight of 2000, and
80% Solvesso 150 (narrow cut-aromatic hydrocarbon solvent, viscosity 1.198 cp 25°C)

EXAMPLE 8

15% Condensate (liquid) having an average molecular weight of approximately 3800, and
85% Solvesso 150

EXAMPLE 9

100% Condensate (liquid) having an average molecular weight of 2000.

TESTS

The black liquor samples which were tested in accordance with the procedure outlined were derived from plants as designated in the tables which follow.

TABLE 1

Percentage Tall Oil, (TO)% Tall Oil Based Upon Solids After Skimming Soap - (Buckeye Test)
Product of Example 2

| Black Liquor Source | Mill "A" Maryland % TO | Mill "B" N. Carolina % TO | Mill "C" S. Carolina % TO | Mill "D" S. Carolina % TO |
|---|---|---|---|---|
| Additive Dosage (ppm) | | | | |
| None | 1.312 | 0.310 | 1.907 | 1.050 |
| 50 | 1.097 | 0.262 | 1.512 | 0.837 |
| 100 | 1.110 | — | — | — |
| 200 | 1.119 | — | — | — |

TABLE 2

Percentage Tall Oil (% TO) = % Tall Oil Based Upon Solids After Skimming (Buckeye Test)

| Product of | Treatment ppm | Mill "E" Georgia % TO | Mill "F" S. Carolina % TO | Mill "G" Georgia % TO |
|---|---|---|---|---|
| Blank | — | 1.66 | 1.01 | 0.503 |
| Ex. 9 | 50 | 1.29 | 0.603 | 0.488 |

TABLE 3

Percentage Tall Oil (% TO) as per Previous Tables

| Product of | Treatment ppm | Georgia Mill % TO |
|---|---|---|
| Blank | — | 0.538 |
| Example 1 | 50 | 0.437 |
| Example 2 | 50 | 0.374 |
| Example 3 | 50 | 0.450 |
| Example 4 | 50 | 0.485 |
| Example 6 | 50 | 0.374 |
| Example 7 | 50 | 0.418 |
| Example 9 | 50 | 0.479 |

TABLE 4

Percentage Tall Oil as per Preceding Tables

| Product of | Mill "G" % TO | Mill "C" % TO | Mill "H" % TO | Mill "I" % TO |
|---|---|---|---|---|
| Blank | 0.310 | 1.907 | 1.05 | 0.538 |
| Example 2 | 0.262 | 1.512 | 0.837 | 0.374 |
| Example 5 | 0.242 | 1.842 | 0.978 | — |
| Example 8 | 0.287 | 1.271 | 0.647 | — |

From the foregoing data, it is clear that the products of the invention were quite successful in increasing the amount of tall oil soap separated. Accordingly, in order to confirm this data, field evaluations were conducted utilizing a full production on-stream soap skimming operation. The trial was conducted at a mill located in Alabama using the product of Example 2. In this mill the actual black liquor (24.6% solids) flow rate during the trial was approximately 749 gallon per minute. The density of the liquor was approximately 9.2 lb/gal. Total 24 hour flow was 9.92 million gallons.

A product feeding scheme was developed based upon actual retention time of the skim tank. The scheme consisted of feeding the product to the soap skimming tank at 50, 100 and 200 ppm. The point of addition was on the top of the intake line of the centrifugal pump feeding the skimmer. The feeding schedule consisted of feeding 200 ppm for 3 hours; lowering the feed rate to 100 ppm and feeding for 100 ppm, and lowering the feed to 50 ppm and feeding for 2 hours. During the feeding period, samples of inflow and outflow liquors were taken before the initial feed and at every hour thereafter. The scheme was based upon a retention time of one hour. Mill personnel obtained their own samples and ran their own tests. All samples were tested for Crude Tall Oil content according to the "Buckeye Test."

The results basically established that the product increased the efficiency of skimming from about 58 to about 70% at 200 ppm, also to about 70% at 100 ppm and to about 62% at 50 ppm. The data obtained by the mill personnel shows a very close correlation with the inventors data.

The specific data derived is included in Table 5.

TABLE 5

Test Results of Product of Example 2 Mill Trial - Buckeye Test

| Feed Rate ppm | Time, Minutes at given feed | Betz Results % CTO* Inflow | Outflow | Eff. % | Mill Results % CTO Inflow | Outflow | Eff. % |
|---|---|---|---|---|---|---|---|
| 200 | 120 | 3.51 | 1.00 | 71.5 | — | — | — |
| 200 | 180 | 2.76 | 0.83 | 69.9 | 2.60 | 0.90 | 65.4 |
| 110 | 60 | 2.43 | 0.70 | 71.2 | — | — | — |
| 100 | 120 | 2.44 | 0.74 | 69.7 | 2.35 | 0.89 | 64.3 |
| 50 | 60 | 2.34 | 0.69 | 70.5 | — | — | — |
| 50 | 120 | 2.10 | 0.79 | 62.4 | — | — | — |
| 0 | 0 | 3.63 | 1.49 | 59.0 | — | — | — |

*TO = Crude Tall Oil

A second in-mill trial was conducted using a mill located in Louisiana. In this trial skim tank inflow and outflow samples were collected and then the product of Example 2 was fed at a rate of 90 ppm for 3 hours. This treatment lowered residual tall oil contact from 0.84 to 0.45% and increased skimmer efficiency from 57 to 76%.

The specifics of the trial were as follows:

TABLE 6

| Product | Feed Rate ppm | Time | Inflow | %Crude Tall Oil Outflow | %Efficiency |
|---|---|---|---|---|---|
| None | — | initial | 1.96 | 0.84 | 57 |
| Example 2 | 90 | 3 hours | 1.90 | 0.45 | 76 |

In view of the foregoing tabulated data, it was evident that the invention permitted the obtention of greater recovery values of crude tall oil and accordingly was responsible for considerably extra revenue.

We claim:

1. A method for enhancing the separation of tall oil soap from black liquors derived from alkaline pulping operations which comprises adding thereto from about 5 to about 1000 parts by weight of a polyoxy-ethylene-polyoxypropylene condensate per million parts by weight of said black liquor.

2. A method according to claim 1 wherein the condensate has an average molecular weight of at least 1000.

3. A method according to claim 1 wherein the condensate contains sufficient polyoxyethylene moieties to constitute from about 10 to about 80% of the condensate of the final molecule.

4. A method according to claim 3 wherein the condensate has a molecular weight of from about 1000 to about 16,000.

5. A method according to claim 4 wherein the condensate is added in an amount of from about 50 to 200 parts per million.

6. A method according to claim 1 wherein the condensate is contained in a composition comprising:
   i. from about 1.0 to about 50% of a polyoxyethylene-polyoxypropylene condensate;
   ii. from about 0.5 to about 30% of a tallow fatty acid and having 12 to 24 carbon atoms;
   iii. from about 0.5 to about 30% of a tallow alcohol having from about 12 to 24 carbon atoms; and
   iv. from about 65 to about 98% water-soluble liquid selected from the group consisting of vegetable oils, aliphatic hydrocarbons, alicyclic hydrocarbons, aromatic hydrocarbons, halogenated aliphatic hydrocarbons, halogenated alicyclic hydrocarbons, halogenated aromatic hydrocarbons, and long chain amines.

7. A method according to claim 6 wherein the condensate has a molecular weight of from about 1,000 to 16,000 and the composition is added in an amount to provide from about 5 to 1000 parts by weight of the condensate.

8. A composition for use in tall oil separation which comprises on a weight ratio basis:
   i. from about 1.0 to about 50% of a polyoxyethylene-polyoxypropylene condensate;
   ii. from about 0.5 to about 30% of a tallow fatty acid and having 12 to 24 carbon atoms;
   iii. from about 0.5 to about 30% of a tallow alcohol having from about 12 to 24 carbon atoms; and
   iv. from about 65 to about 98% water-insoluble liquid selected from the group consisting of vegetable oils, aliphatic hydrocarbons, alicyclic hydrocarbons, aromatic hydrocarbons, halogenated aliphatic hydrocarbons, halogenated alicyclic hydrocarbons, halogenated aromatic hydrocarbons, and long chain amines.

9. A composition according to claim 8 comprising:
   i. from about .4 to 25% of the condensate
   ii. from about 2 to 15% of tallow acid having from about 16 to 18 carbon atoms;
   iii. from about 2 to about 15% of a tallow alcohol having from about 16 to 18 carbon atoms, and
   iv. from about 75 to 93% of a primarily paraffin oil.

10. A composition according to claim 9 wherein the condensate has a molecular weight of from about 1000 to 16,000.

11. A composition according to claim 10 wherein the condensate contains sufficient polyoxyethylene moities to constitute from about 10 to about 80% of the condensate final molecule.

* * * * *